UNITED STATES PATENT OFFICE.

ANTOINE RACICOT, OF TROY, NEW YORK.

IMPROVEMENT IN MEDICAL COMPOUNDS FOR CHOLERA.

Specification forming part of Letters Patent No. 140,642, dated July 8, 1873; application filed March 21, 1873.

*To all whom it may concern:*

Be it known that I, ANTOINE RACICOT, of Troy, in the county of Rensselaer and State of New York, have invented certain Improvements in Medical Compounds, of which the following is a specification:

My invention relates to a medical compound to be used in cases of Asiatic cholera, cholera morbus, dyspepsia, and various other diseases; and consists in a combination of tincture of sesquichloride of iron, tincture of capsicum, laudanum, tincture of camphor, sulphurous ether, tincture of pyrola of Jos. St. Jacques, and tincture of cinnamon, as hereinafter more fully described.

In compounding my mixture I first prepare the different tinctures and other ingredients in the following manner:

Tincture of Pyrola of Jos. St. Jacques.—I macerate three pounds of pyrola leaves in one gallon of alcohol for twenty-one days, and then strain the liquor.

Tincture of Sesquichloride of Iron.—I pour one pint of hydrochloric acid upon six or seven of sesquioxide of iron in a glass vessel, and leave it to digest for four days, shaking the vessel frequently. Then I add three pints of rectified spirit and strain the liquor.

Tincture of Capsicum.—I macerate one-half pound of bruised capsicum in one gallon of proof alcohol for fifteen days, and strain.

Laudanum.—I macerate two and one-half pounds of powdered opium in two pints of diluted alcohol for twenty-one days, and then strain the liquor.

Tincture of Camphor.—I dissolve twenty-one ounces of camphor in one gallon of rectified alcohol for sixteen days and then strain.

Sulphuric Ether.—I use either the English or American preparations, as they are found in the market.

Tincture of Cinnamon.—I macerate one pound of bruised cinnamon in one gallon of proof spirit for sixteen days, and then strain.

I then mix the above tinctures and other preparations in the following proportions: Tincture of sesquichloride of iron, four ounces; tincture of capsicum, four ounces; laudanum, four ounces; tincture of camphor, two ounces; sulphuric ether, two ounces; tincture of pyrola of Jos. St. Jacques, one dram; tincture of cinnamon, one dram.

I then allow the compound to macerate for fifteen days, during which time I frequently shake the vessel containing it. At the end of the time mentioned the compound is ready for use.

The compound will be found a powerful specific in cases of Asiatic cholera, cholera morbus, and in dyspepsia, indigestion, pulmonic diseases, weakness of the stomach, dizziness, headache resulting from derangement of the digestive organs, chlorose, leucorrhœa, suppression of menses, colics, cold, chills, &c.

Having thus described my invention, what I claim is—

The compound composed of the above ingredients, in substantially the proportions set forth.

ANTOINE RACICOT.

Witnesses:
Jos. B. LAFLEN,
Jos. LAPORTE.